United States Patent
Goetz et al.

(10) Patent No.: US 7,152,295 B2
(45) Date of Patent: Dec. 26, 2006

(54) FASTENING ARRANGEMENT FOR A CENTER CONSOLE MODULE OF A MOTOR VEHICLE

(75) Inventors: Erwin Goetz, Weil der Stadt (DE); Heinz Murau, Stuttgart (DE); Guido Horsch, Althengstett (DE); Joerg Rambow, Landau (DE); Friedrich Hoge, Gerlingen (DE); Jochen Leise, Hemmingen (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 199 days.

(21) Appl. No.: 10/854,780

(22) Filed: May 27, 2004

(65) Prior Publication Data

US 2005/0015960 A1  Jan. 27, 2005

(30) Foreign Application Priority Data

May 27, 2003 (DE) ............................... 103 23 999

(51) Int. Cl.
  *B23P 11/00* (2006.01)
  *B62D 25/14* (2006.01)
(52) U.S. Cl. ............ 29/434; 296/72; 296/193.02; 180/90; 29/469; 29/525.02; 29/525.11
(58) Field of Classification Search ............ 29/434, 29/464, 468, 469, 525.01, 525.02, 525.11; 296/70, 72, 193.01, 193.02, 192; 180/90
  See application file for complete search history.

(56) References Cited

U.S. PATENT DOCUMENTS

| | | | | |
|---|---|---|---|---|
| 4,353,430 A | * | 10/1982 | Sjoqvist et al. | ............... 180/90 |
| 5,082,078 A | | 1/1992 | Umeda et al. | |
| 5,120,106 A | | 6/1992 | Sakurai et al. | |
| 5,477,603 A | * | 12/1995 | Kemichick | .................... 29/468 |
| 6,138,802 A | * | 10/2000 | McFarlane et al. | ......... 192/13 R |
| 6,276,739 B1 | * | 8/2001 | Wich | ............................ 296/72 |
| 6,315,347 B1 | * | 11/2001 | Gotz | ............................ 296/72 |
| 6,523,878 B1 | | 2/2003 | Scheidel | |
| 6,554,352 B1 | * | 4/2003 | Nagy | ..................... 296/203.02 |
| 6,581,967 B1 | * | 6/2003 | Logan et al. | ................ 280/779 |
| 6,695,374 B1 | * | 2/2004 | Gebreselassie et al. | ........ 180/90 |
| 6,851,742 B1 | * | 2/2005 | Kubiak | .................. 296/193.02 |

(Continued)

FOREIGN PATENT DOCUMENTS

DE  41 05 679  7/1996

(Continued)

*Primary Examiner*—Essama Omgba
(74) *Attorney, Agent, or Firm*—Crowell & Moring LLP

(57) ABSTRACT

A fastening arrangement for a center console module of a motor vehicle includes a transversely extending assembly carrier, a pedal bracket rigidly fastened to the assembly carrier, and a front wall cover connected with the pedal bracket. The assembly carrier is fastened by way of first screwed connections to the two adjoining opposite A-columns, and the front wall cover is fastened by way of second screwed connections to the front wall. So that a clean joint pattern is created between the control panel and the adjoining covering parts in the vehicle occupant compartment, while the mounting is simple and reliable with respect to the process and irrespective of the occurring body shell tolerances, it is provided that one stop part respectively for fastening the assembly carrier in the X-direction is arranged on the two A-columns, and that, between the pedal bracket and the front wall cover, an adjusting device is connected, by means of which body shell and manufacturing tolerances in the X-direction can be compensated.

15 Claims, 3 Drawing Sheets

U.S. PATENT DOCUMENTS

| | | | |
|---|---|---|---|
| 6,890,016 B1 * | 5/2005 | Brancheriau | 296/70 |
| 6,932,410 B1 * | 8/2005 | DeLong et al. | 296/72 |
| 6,974,172 B1 * | 12/2005 | Gebreselassie et al. | 296/39.3 |
| 2002/0105024 A1 | 8/2002 | Fujihira | |

FOREIGN PATENT DOCUMENTS

| | | |
|---|---|---|
| DE | 100 10 709 | 8/2001 |
| DE | 101 04 790 | 8/2002 |
| DE | 102 00 886 A1 | 10/2003 |
| WO | WO 01/85529 A1 | 11/2001 |

\* cited by examiner

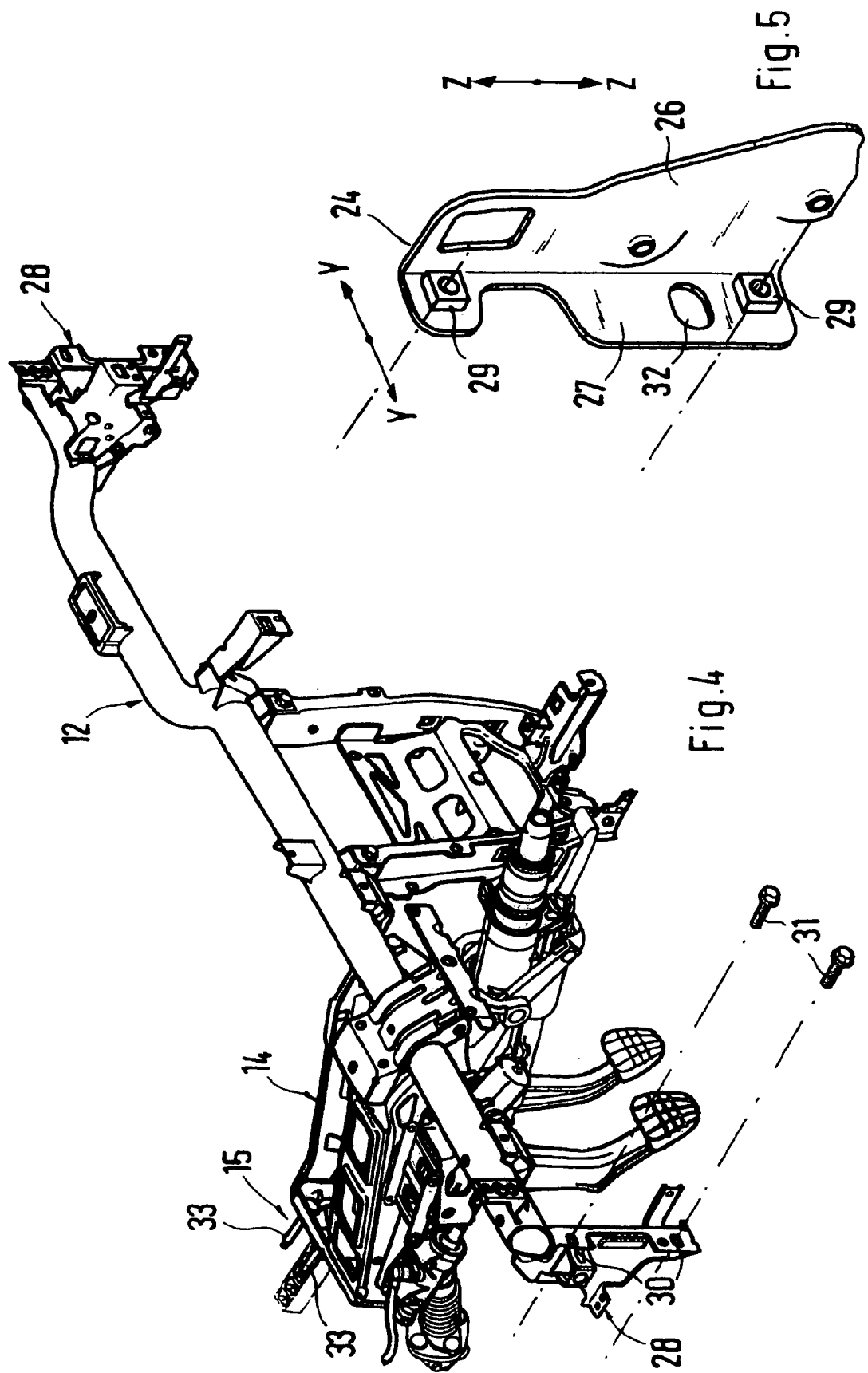

FASTENING ARRANGEMENT FOR A CENTER CONSOLE MODULE OF A MOTOR VEHICLE

BACKGROUND AND SUMMARY OF THE INVENTION

This application claims the priority of German Patent Application No. 103 23 999.5 filed May 27, 2003, the disclosure of which is expressly incorporated by reference herein.

The invention relates to a fastening arrangement for a center console module of a motor vehicle. Certain preferred embodiments relate to a fastening arrangement for a center console module of a motor vehicle, having a transversely extending assembly carrier, a pedal bracket rigidly fastened to the assembly carrier, and a front wall cover connected with the pedal bracket, the assembly carrier being fastened by way of first screwed connections to the two adjoining opposite A-columns, and the front wall cover being fastened by way of second screwed connections to the front wall.

In the case of a known center console module, the front wall cover is connected with the free end of the pedal bracket by means of fastening screws. When the center console module is assembled, the front wall cover, on the one side, is moved onto the front wall by means of an adhesive bead and is screwed to the front wall. On the other side, the two ends of the transversely extending assembly carrier are fastened by way of fastening elements (fastening screws and spacer elements), which are aligned in the transverse direction of the vehicle, to the adjacent A-columns. Tolerances in the longitudinal direction (X-direction) of the vehicle can be compensated without tension only to a limited extent by way of oblong holes in the side wall of the assembly carrier.

In the case of the initially-described arrangement, the alignment of the center console module takes place by way of the front wall; that is, the quality of the interior—the courses of the joints and the transitions in the vehicle occupant compartment—is defined by the manufacturing tolerances of the body shell and the tensions occurring in the center console. The course of the joints in the vehicle occupant compartment can therefore not be controlled. In the case of unfavorable tolerance situations, distortions may occur when the center console module is installed, and non-uniform courses of the joints in the vehicle occupant compartment between the control panel and the adjoining covering parts are difficult to subsequently correct.

It is an object of the invention to further develop a fastening arrangement for a center console module of a motor vehicle such that, while the assembly is simple with respect to the process and irrespective of the occurring body shell tolerances, a clean joint pattern is created between the control panel and the adjoining covering parts (particularly the A-column covering) in the vehicle occupant compartment. On the other hand, a good sealing is to be ensured in the area of the front wall, between the vehicle occupant compartment and the wet space situated in front of it.

According to the present invention, this object is achieved according to certain preferred embodiments by providing a fastening arrangement for a center console module of a motor vehicle, having a transversely extending assembly carrier, a pedal bracket rigidly fastened to the assembly carrier, and a front wall cover connected with the pedal bracket, the assembly carrier being fastened by way of first screwed connections to the two adjoining opposite A-columns, and the front wall cover being fastened by way of second screwed connections to the front wall, wherein one stop part respectively for fastening the assembly carrier in the X-direction is arranged on the two A-columns, and wherein an adjusting device is connected between the pedal bracket and the front wall cover, by means of which adjusting device body shell and manufacturing tolerances in the X-direction can be compensated. Additional characteristics advantageously further developing the invention are described herein and in the claims.

Important advantages achieved by means of the present invention are that, as a result of the alignment of the center console module with respect to the two A-columns and because of the inserted adjusting device for the front wall cover, which acts in the X-direction, a simple assembly for the center console module is created which is reliable with respect to the process. By way of stop parts on both A-columns, the assembly carrier with the control panel is positioned in the X-direction. By way of a support in the Z-direction and by way of a positioning bore in the Y-direction in a positionally correct manner with respect to the adjoining covering parts and is aligned such that uniform, clean joint patterns are ensured between the control panel and the adjoining covering parts (A-column coverings, door coverings and center console).

By means of the adjusting device connected between the pedal bracket and the front wall cover, even high manufacturing tolerances of the body shell in X can be compensated in a simple manner. Y and Z are defined by means of positioning. In this case, all forces occurring during the operation can be transmitted.

The adjusting device has a simple construction; it ensures a mounting of the center console module which is reliable with respect to the process and is easily adjustable. The adjusting device is advantageously formed by at least one weld bolt connected with the pedal bracket, a displaceable screw cap, which carries the front wall cover, being screwed onto an external thread of the weld bolt.

By separating the sealing of the thread and the passage hole from the screwed connection at the adjusting device, a perfect sealing-off is achieved between the vehicle occupant space and the wet space disposed in front of it. In this case, the sealing of the thread can also be ensured in the screwed connection.

These and other objects, features and advantages of the present invention will become more readily apparent from the following detailed description of currently preferred configurations thereof when taken in conjunction with the accompanying drawings.

BRIEF DESCRIPTION OF THE DRAWINGS

FIG. 4 is an exploded view of the assembly carrier with the pedal bracket and the front wall cover.

FIG. 5 is a perspective view of a stop part for the assembly show in FIG. 1–4.

DETAILED DESCRIPTION OF THE DRAWINGS

Figure 1:
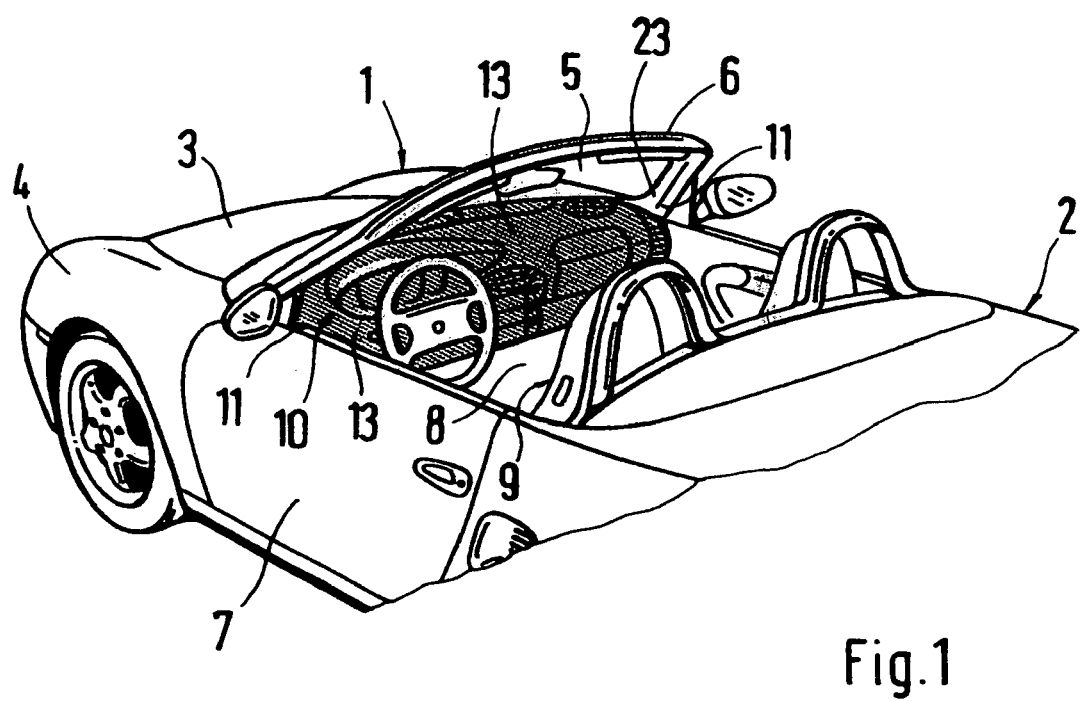
FIG. 1 is a perspective partial view diagonally from the rear of a motor vehicle with an installed center console module.

The motor vehicle 1 illustrated in FIG. 1 and formed by a passenger car comprises a stationary vehicle body 2 which, in the illustrated area, comprises a forward cover 3, lateral fenders 4, a windshield frame 6 accommodating the windshield 5 and lateral doors 7. Seats 9 and a center console module 10 formed by a prefabricated constructional unit are arranged inside a vehicle occupant compartment 8. The center console module 10 provided below the windshield 5 extends between the two opposite A-columns 11 of the vehicle body 2.

Figure 2:
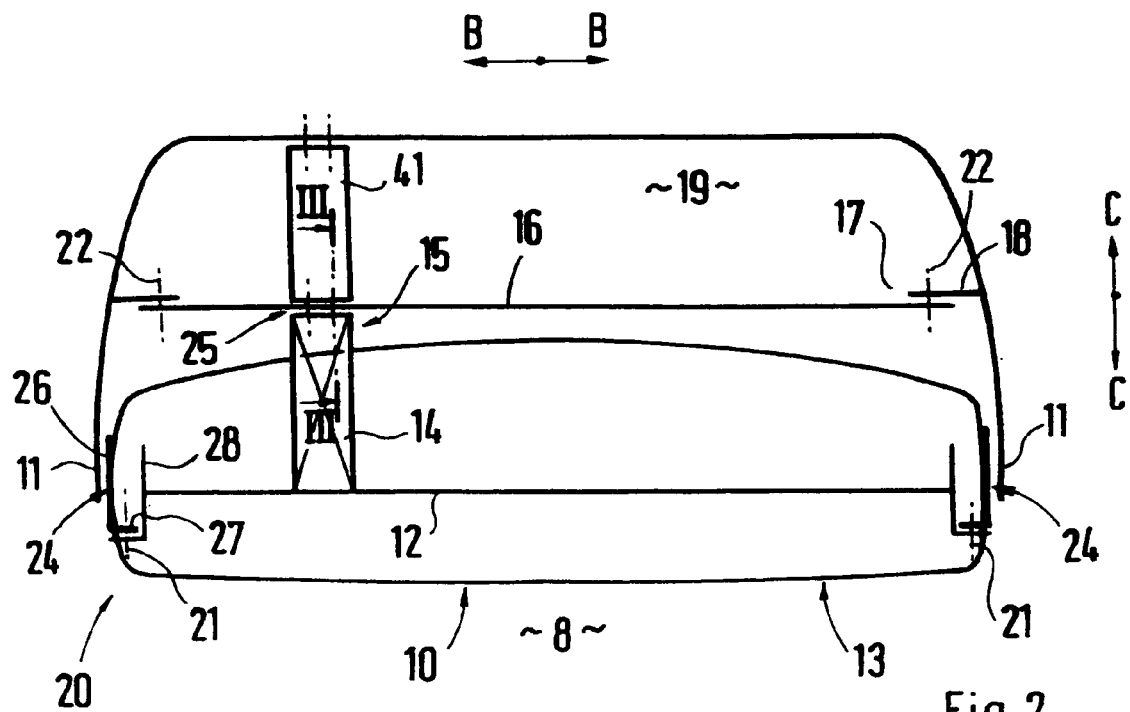
FIG. 2 is a schematic top view of a fastening arrangement for the center console module, constructed according to a preferred embodiment of the present invention.
Figure 3:
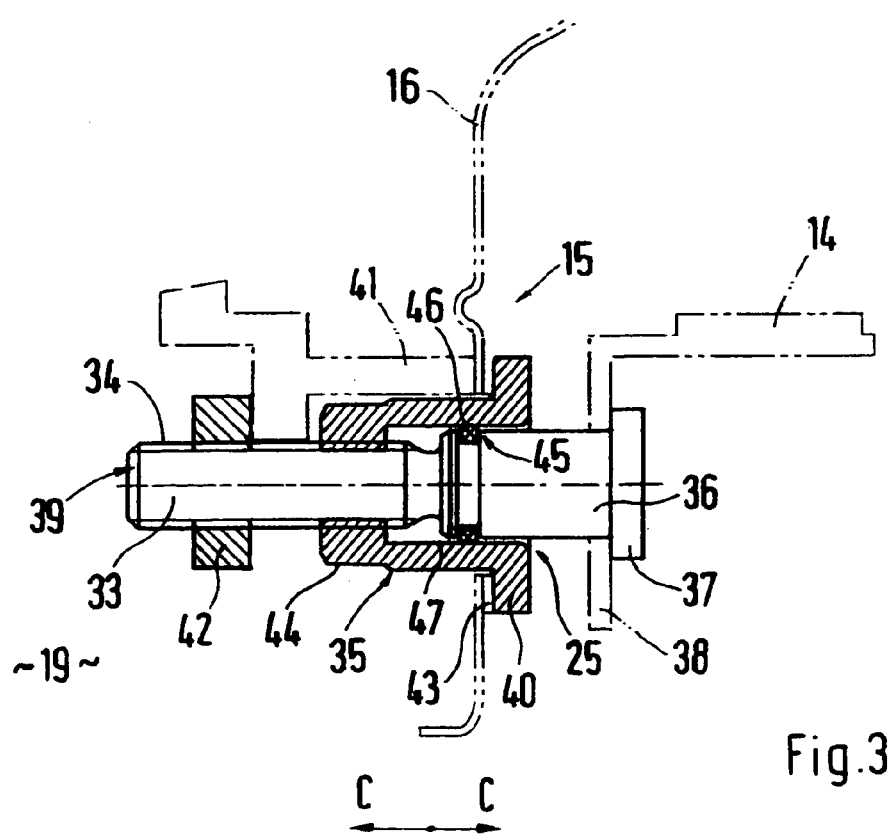
FIG. 3 is an enlarged sectional view taken along Line III—III of FIG. 2 rotated by 90°.

The center console module 10 comprises essentially an assembly carrier 12 which extends in the transverse direction B-B of the vehicle and accommodates the complete control panel 13, together with the cabling, a heating and air-conditioning unit respectively, a steering system as well as other components not listed in detail. A pedal bracket 14 is rigidly connected with the assembly carrier 12, for example, by means of welding, the free end 15 of the pedal bracket 14 facing away from the assembly carrier 12 being in an operative connection with the front wall cover 16. When the center console module 10 is installed, the front wall cover 16 closes at least one opening 17 of a stationary, transversely extending front wall 18 of the vehicle body 2, which separates the vehicle occupant compartment 8 from a wet space 19 (radiator tank) disposed in front. FIG. 2 schematically shows a fastening arrangement 20 for the center console module 10. The assembly carrier 12 is fastened by way of first screwed connections 21 to the two opposite A-columns 11, and the front wall cover 16 is fastened by way of two screwed connections 22 to the front wall 18.

So that, on the one hand, a clean course of the joints is ensured in the vehicle occupant compartment 8 between the control panel 13 and the adjoining coverings (particularly A-column coverings 23), and, on the other hand, high vehicle-body-side manufacturing tolerances can be compensated, it is provided that one stop part 24 respectively is arranged on the two A-columns 11 for fixing the assembly cross support 12 in the X-direction, and that an adjusting device 25 is connected between the pedal bracket 14 and the front wall cover 16, by means of which adjusting device 25, body shell and manufacturing tolerances in the X-direction can be compensated.

The two stop parts 24 are positioned by means of an assembling jig, not shown in detail, in correct positions on the adjoining A-columns 11 and are fastened by means of a screwed or welded connection on the A-columns 11. Each angularly constructed stop part 24 comprises a first leg 26, which extends approximately in the longitudinal direction of the vehicle and rests on the adjacent interior side of the A-column 11 and is fastened there. Furthermore, each stop part 24 has a second leg 27, which extends in the transverse direction of the vehicle and on which a side wall 28 of the assembly carrier 12 rests when the center console module 10 is mounted, and is held in position there by means of the first screwed connection 21. The first screwed connection 21 is formed by weld nuts 29 which are provided on the leg 27 and into which fastening screws 31 can be screwed which are aligned in the longitudinal direction of the vehicle by openings 30 disposed in front. In the embodiment shown, two screwed connections 21 arranged above one another are provided on each A-column 11, for fastening the assembly carrier 12. Between the screwed connections 21 situated above one another, a positioning opening 32 is provided on the second leg 27, into which positioning opening 32 a positioning bolt mounted on the handling device for the center console module 10 engages during the mounting of the center console module 10 and thereby fixes the center console module 10 in the Z-direction (vertical direction of the vehicle). The positioning opening 32 is formed by an oblong hole extending in the transverse direction of the vehicle, so that the center console module 10 can be aligned to a defined extent in the Y-direction (transverse direction of the vehicle) by a defined positioning bore with respect to the adjoining covering parts in order to ensure uniform courses of the joints. In Z, the alignment takes place by a defined aligning. The assembly cross support 12 can be fixed by means of additional conventional fastenings on the transmission tunnel and on a lower cowl cross member (not shown in detail).

During the assembly, the front wall cover 16 is moved from the vehicle occupant compartment 8 in the direction of the front wall and is placed onto the front wall by means of an adhesive bead. In the embodiment shown, the second screwed connections 22 are formed by weld nuts mounted on the front wall cover 16, into which weld nuts fastening screws are screwed from the direction of the wet space 19 situated in front (not shown in detail).

The adjusting device 25 between the pedal bracket 14 and the front wall cover 16 in the embodiment shown is formed by at least one weld bolt 33 which is connected with the pedal bracket 14, extends away from it and comprises an external thread 34, a displaceable screw cap 35 being screwed onto the external thread 34 and carrying the front wall cover 16. The at least one weld bolt 33 extends through an opening 36 of the pedal bracket 14 and is supported by means of an end-side collar 37 on an end-side transversely extending wall 38 of the pedal bracket 14. The free end 39 of the weld bolt 33 projects into the wet space 19. The front wall cover 16 is held in a clamping manner between an end-side radial collar 40 of the screw cap 35 and an opposite intermediate piece 41. The intermediate piece 41 is pressed by means of a counter nut 42 against the side of the front wall cover 16 facing away from the collar 40. A sealing ring 43 is connected between the radial collar 40 and the adjoining side of the front wall cover 16. On the side facing away from the pedal bracket 14, the screw cap 35 has an external polygon 44 for the adjustment by means of an auxiliary tool.

A sealing device 45 is provided between the screw cap 35 and the weld bolt 33, separately from the fastening of the front wall cover 16. This sealing device 45 is formed, for example, by means of an O-ring 46 which is placed onto the weld bolt 33 and which is sealingly supported by means of its external side on an internal side of a hollow-cylindrical receiving device 47 of the screw cap 35. Instead of the O-ring 46, a sealing device 45 may be provided between the external thread of the weld bolt 33 and an internal thread of the screw cap 35, which sealing device 45 prevents an entering of water from the wet cell 19 into the vehicle occupant compartment 8.

In the embodiment shown, the adjusting device 25 comprises two mutually spaced, parallel-extending weld bolts 33, a separate screw cap 35 being screwed onto each weld bolt 33.

By means of the screw cap 35 carrying the front wall cover 16, the latter can be displaced in the X-direction (longitudinal direction C-C of the vehicle) relative to the front wall 18, and high vehicle-body-side manufacturing tolerances can thereby be compensated in a simple manner which is reliable with respect to the process. The adjusting device 25 could also be formed by a tube which is connected with the pedal bracket 14 and has an external thread onto which a screw cap 35 carrying the front wall cover 16 or another tube, which receives the front wall cover 16 and can be displaced in the longitudinal direction, can be placed (not shown in detail).

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A fastening arrangement for a center console module of a motor vehicle, having a transversely extending assembly carrier, a pedal bracket rigidly fastened to the assembly carrier, and a front wall cover connected with the pedal bracket, the assembly carrier being fastened by first screwed connections to two adjoining opposite A-columns, and the front wall cover being fastened by second screwed connections to a front wall,
wherein one stop part for fastening the assembly carrier in the X-direction is arranged on each of the two A-columns,
an adjusting device is connected between the pedal bracket and the front wall cover, by means of which adjusting device body shell and manufacturing tolerances in the X-direction can be compensated,
the adjusting device comprising at least one weld bolt which is connected with the pedal bracket, extends away from it and has an external thread, a displaceable screw cap, which carries the front wall cover, being screwed onto the external thread,
the at least one weld bolt extends through an opening of the pedal bracket and is supported by an end-side collar on a wall of the pedal bracket, and the free end of the weld bolt faces a wet space disposed in front.

2. The fastening arrangement according to claim 1, wherein the front wall cover is held in a clamping manner between an end-side radial collar of the screw cap and an opposite intermediate piece, the intermediate piece being pressed by means of a counter nut against the side of the front wall cover facing away from the radial collar.

3. The fastening arrangement according to claim 2, wherein a sealing ring is connected between the radial collar and the adjoining side of the front wall cover.

4. The fastening arrangement according to claim 1, wherein, on the side facing away from the pedal bracket, the screw cap has an external polygon for the adjustment by means of an auxiliary tool.

5. The fastening arrangement according to claim 1, wherein a sealing device is provided between the screw cap and the weld bolt, separately from the fastening of the front wall cover.

6. The fastening arrangement according to claim 5, wherein the sealing device is formed by an O-ring placed onto the weld bolt, which O-ring is sealingly supported by means of its exterior side on the interior side of a hollow-cylindrical receiving device of the screw cap.

7. The fastening arrangement according to claim 1, wherein the adjusting device comprises two mutually spaced, parallel-extending weld bolts, a separate screw cap being screwed onto each weld bolt.

8. The fastening arrangement according to claim 1, wherein, by way of an assembling jig, said stop parts are positioned and fixed on the two A-columns, on which stop parts respective end-side side walls of the transversely extending assembly carrier can be fastened.

9. The fastening arrangement according to claim 8, wherein openings and weld nuts arranged behind these openings are provided on a leg of each stop part extending in the transverse direction of the vehicle, into which weld nuts fastening screws for fixing the assembly carrier can be screwed, which fastening screws are aligned in a longitudinal direction of the vehicle.

10. The fastening arrangement according to claim 1, wherein a positioning opening is provided on an transversely extending leg of the stop part, in which positioning opening a positioning bolt mounted on a handling device for the center console module engages during the mounting of the center console module and thereby fixes the center console module in the Z-direction.

11. The fastening arrangement according to claim 10, wherein the positioning opening is formed by an oblong hole extending in the transverse direction of the vehicle, so that the center console module can be aligned in the Y-direction with respect to adjoining covering parts.

12. A process of making a passenger vehicle body assembly comprising:
forming a center console module having an in-use transversely extending assembly carrier, a pedal bracket rigidly fastened to the assembly carrier, and a front wall cover connected with the pedal bracket,
fastening the assembly carrier by way of first screwed connections to respective adjoining A-columns,
fastening the front wall cover to a vehicle body front wall by way of second screwed connections,
arranging one stop part for fastening the assembly carrier in the X-direction on the two A-columns, and
connecting an adjusting device is connected between the pedal bracket and the front wall cover, by means of which adjusting device body shell and manufacturing tolerances in the X-direction can be compensated,
wherein the adjusting device comprises at least one weld bolt which is connected with the pedal bracket, extends away from it and has an external thread, a displaceable screw cap, which carries the front wall cover, being screwed onto the external thread, and the at least one weld bolt extends through an opening of the pedal bracket and is supported by means of an end-side collar on a wall of the pedal bracket, and wherein the free end of the weld bolt faces a wet space disposed in front.

13. A process of making a passenger vehicle body assembly comprising:
forming a center console module having an in-use transversely extending assembly carrier, a pedal bracket rigidly fastened to the assembly carrier, and a front wall cover connected with the pedal bracket,
fastening the assembly carrier by way of first screwed connections to respective adjoining A-columns,
fastening the front wall cover to a vehicle body front wall by way of second screwed connections,
arranging one stop part for fastening the assembly carrier in the X-direction on the two A-columns, and
connecting an adjusting device is connected between the pedal bracket and the front wall cover, by means of which adjusting device body shell and manufacturing tolerances in the X-direction can be compensated,
wherein the adjusting device comprises at least one weld bolt which is connected with the pedal bracket, extends away from it and has an external thread, a displaceable screw cap, which carries the front wall cover, being screwed onto the external thread, wherein a sealing ring is connected between the radial collar and the adjoining side of the front wall cover.

14. A process of making a passenger vehicle body assembly comprising:

forming a center console module having an in-use transversely extending assembly carrier, a pedal bracket rigidly fastened to the assembly carrier, and a front wall cover connected with the pedal bracket, fastening the assembly carrier by way of first screwed connections to respective adjoining A-columns, fastening the front wall cover to a vehicle body front wall by way of second screwed connections, arranging one stop part for fastening the assembly carrier in the X-direction on the two A-columns, and connecting an adjusting device is connected between the pedal bracket and the front wall cover, by means of which adjusting device body shell and manufacturing tolerances in the X-direction can be compensated, wherein the adjusting device comprises at least one weld bolt which is connected with the pedal bracket, extends away from it and has an external thread, a displaceable screw cap, which carries the front wall cover, being screwed onto the external thread, wherein a sealing device is provided between the screw cap and the weld bolt, separately from the fastening of the front wall cover.

15. A process of making a passenger vehicle body assembly according to claim 14, wherein the sealing device is formed by an O-ring placed onto the weld bolt, which O-ring is sealingly supported by means of its exterior side on the interior side of a hollow-cylindrical receiving device of the screw cap.

* * * * *